United States Patent
Lambert et al.

[11] Patent Number: 6,106,935
[45] Date of Patent: Aug. 22, 2000

[54] HEAT SEALABLE FILM

[75] Inventors: W. Scott Lambert, Simpsonville; Kimberly Ann Mudar, Greer, both of S.C.

[73] Assignee: Cryovac, Inc., Duncan, S.C.

[21] Appl. No.: 09/287,919

[22] Filed: Apr. 7, 1999

Related U.S. Application Data

[63] Continuation of application No. 08/631,489, Apr. 12, 1996, which is a continuation-in-part of application No. 08/274,607, Jul. 13, 1994.

[51] Int. Cl.[7] .......................... B32B 27/30; B32B 27/32; B32B 27/34
[52] U.S. Cl. .......................... 428/220; 428/216; 428/336; 428/347; 428/475.8; 428/476.1; 428/476.3; 428/476.9; 428/483; 428/518; 428/520; 428/910
[58] Field of Search ................................. 428/216, 220, 428/336, 347, 475.8, 476.1, 476.3, 476.9, 483, 518, 520, 910

[56] References Cited

U.S. PATENT DOCUMENTS

| | | | |
|---|---|---|---|
| 4,514,465 | 4/1985 | Schoenberg | 428/339 |
| 4,540,416 | 9/1985 | Hattori et al. | 604/410 |
| 4,551,380 | 11/1985 | Schoenberg | 428/218 |
| 4,617,241 | 10/1986 | Mueller | 428/520 |
| 4,640,856 | 2/1987 | Ferguson et al. | 428/36 |
| 4,643,943 | 2/1987 | Schoenberg | 428/339 |
| 4,801,486 | 1/1989 | Quacquarella et al. | 428/34.9 |
| 4,863,769 | 9/1989 | Lustig et al. | 428/34.9 |
| 4,927,708 | 5/1990 | Herran et al. | 428/332 |
| 5,004,647 | 4/1991 | Shah | 428/349 |
| 5,314,749 | 5/1994 | Shah | 428/349 |

FOREIGN PATENT DOCUMENTS

| | | |
|---|---|---|
| 1078247 | 5/1980 | Canada . |
| 0 597 502 A3 | 5/1994 | European Pat. Off. . |
| 1 591 423 | 10/1977 | United Kingdom . |
| WO 94/07954 | 4/1994 | WIPO . |
| WO 95/00333 | 1/1995 | WIPO . |

*Primary Examiner*—D. S. Nakarani
*Attorney, Agent, or Firm*—Mark B. Quatt

[57] ABSTRACT

A film includes at least one layer comprising a blend of a first polymer having a crystalline melting point of at least 260° F., and a density of at least 0.925 grams per cubic centimeter, and a second olefinic polymer comprising an ethylene/alpha-olefin copolymer with a density of less than 0.916 grams per cubic centimeter, wherein the film heat seals at a temperature of at least 180° F. The film can include a core layer including an oxygen barrier; and two outer layers each including a blend of a first polymer having a crystalline melting point of at least 260° F., and a density of at least 0.925 grams per cubic centimeter, and a second olefinic polymer comprising an ethylene/alpha-olefin copolymer with a density of less than 0.916 grams per cubic centimeter, wherein the film heat seals at a temperature of at least 180° F. The film can also include one or more intermediate layers disposed between the core layer and respective outer layers, and one or more adhesive layers disposed between respective intermediate and outer layers. Good heat sealability is obtained.

10 Claims, 3 Drawing Sheets

HEAT SEALABLE FILM

This is a continuation of application Ser. No. 08/631,489, filed on Apr. 12, 1996, now pending, which is a continuation-in-part of U.S. Ser. No. 08/274,607 filed Jul. 13, 1994 now pending.

FIELD OF THE INVENTION

The present invention relates to a heat sealable film which may be utilized to package a variety of items.

BACKGROUND OF THE INVENTION

The present invention is directed to a new and useful film. Films, and especially heat shrinkable films are well known for many packaging applications.

An example is BDF-2050 film supplied commercially by W. R. Grace. This film has proven lo be very useful in packaging applications where high shrink, good optics, oxygen barrier and other desirable features of the packaging film are needed. Film of this type is disclosed e.g. in U.S. Pat. No. 5,004,647 to Shah, incorporated herein by reference in its entirety.

Another example is a film, LID1050, useful in lidding applications. Film of this type is disclosed e.g. in EP 0692374, incorporated herein by reference in its entirety.

It would be desirable to use films, especially heat shrinkable materials like BDF-2050 in end use applications requiring very good heat sealability. For example, in uses where a foamed polystyrene tray is loaded with a food product and then overwrapped, impulse sealing is often used. Equipment such as Ilapak, Ossid, and Rose Forgrove systems are used in such applications. Some of these systems are high speed, producing packages at speeds of up to 100 ppm (parts or packages per minute). This use requires a film with good heat sealing properties, especially hot tack strength. Since hot tack strength is related to the flowability of the film material under heat and pressure, and in particular the flowability of the sealant layer of the film, it is important that the film flow and fuse together quickly under sealing conditions so that reliable heat seals can be made consistently at relatively high speeds.

For lidding on foam trays, toughness as measured by a low percentage of abuse failures (cuts) is required. For uses where a polyester or aluminum coated tray is loaded with a food product and then overwrapped with a film, cuts in the tray edges can occur during packaging and distribution. Impulse sealing is used for this type of overwrapping also. Thus, in this end-use application, a combination of good sealing and toughness is needed.

SUMMARY OF THE INVENTION

In one aspect, the present invention comprises a film comprising at least one layer comprising a blend of a first polymer having a crystalline melting point of at least 260° F. and a density of at least 0.925 grams per cubic centimeter, and a second olefinic polymer comprising an ethylene/alpha-olefin copolymer with a density of less than 0.916 grams per cubic centimeter, wherein the film heat seals at a temperature of at least 180° F.

In a second aspect, a multilayer film comprises a core layer comprising an oxygen barrier; and two outer layers each comprising a blend of a first polymer having a crystalline melting point of at least 260° F. and a density of at least 0.925 grams per cubic centimeter, and a second olefinic polymer comprising an ethylene/alpha-olefin copolymer with a density of less than 0.916 grams per cubic centimeter, wherein the film heat seals at a temperature of at least 180° F.

In a third aspect, a multilayer film comprises a core layer comprising an oxygen barrier; two intermediate layers each comprising a polyamide; and two outer layers each comprising a blend of a first polymer having a crystalline melting point of at least 260° F. and a density of at least 0.925 grams per cubic centimeter, and a second olefinic polymer comprising an ethylene/alpha-olefin copolymer with a density of less than 0.916 grams per cubic centimeter, wherein the film heat seals at a temperature of at least 180° F.

DEFINITIONS

The term "core layer" as used herein refers to a centralmost layer of a multi-layer film.

The term "outer layer" as used herein refers to what is typically an outermost, usually surface layer of a multi-layer film, although additional layers and/or films can be adhered to it.

The term "intermediate" as used herein refers to a layer of a multi-layer film which is between an outer layer and core layer of the film.

As used herein, the phrase "ethylene/alpha-olefin copolymer" (EAO) refers to such heterogeneous materials as linear medium density polyethylene (LMDPE), linear low density polyethylene (LLDPE), and very low and ultra low density polyethylene (VLDPE and ULDPE); as well as homogeneous polymers (HEAO) such as TAFMER(™) ethylene/alpha olefin copolymers supplied by Mitsui Petrochemical Corporation and metallocene-catalyzed polymers such as EXACT(™) materials supplied by Exxon. These materials generally include copolymers of ethylene with one or more comonomers selected from $C_4$ to $C_{10}$ alpha-olefins such as butene-1 (i.e., 1-butene), hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. Other ethylene/alpha-olefin copolymers, such as the long chain branched homogeneous ethylene/alpha-olefin copolymers available from the Dow Chemical Company, known as AFFINITY(™) resins, are also included as another type of ethylene/alpha-olefin copolymer useful in the present invention.

"High density polyethylene" (HDPE), as defined herein, has a density of 0.94 grams per cubic centimeter or more, "linear medium density polyethylene" (LMDPE) as used herein, has a density from 0.925 grams per cubic centimeter to 0.939 grams per cubic centimeter, "linear low density polyethylene" (LLDPE) as used herein has a density in the range of from about 0.916 to 0.924 grams per cubic centimeter, and "very low density polyethylene" has a density of less than 0.916 grams per cubic centimeter.

"Heat shrinkable" is defined herein as a property of a material which, when heated to an appropriate temperature above room temperature (for example 96° C.), will have a free shrink of 5% or greater in at least one linear direction. Films of the invention will have a free shrink of preferably at least 10% in at least one linear direction at 96° C.

"Polymer" herein includes copolymers, terpolymers, etc. "Copolymer" herein includes bispolymers, terpolymers, etc.

All compositional percentages used herein are calculated on a "by weight" basis.

DESCRIPTION OF THE PREFERRED EMBODIMENTS

The film of the present invention can be a monolayer film. It comprises a blend of a first polymer having a crystalline melting point of at least 260° F. and a density of at least 0.925 grams per cubic centimeter, and a second olefinic polymer comprising an ethylene/alpha-olefin copolymer with a density of less than 0.916 grams per cubic centimeter, wherein the blend heat seals at a temperature of at least 180° F.

The first polymer is preferably ethylene polymer having a density of at least 0.925 grams per cubic centimeter, polypropylene, and/or propylene/ethylene copolymer. Blends of these materials can be used. The ethylene polymer is preferably an ethylene/alpha-olefin copolymer with a $C_4$ to $C_{10}$ comonomer, more preferably linear medium density polyethylene. The core layer can also comprise high density polyethylene. Ethylene polymers with a density of at least 0.926 g/cc, such as 0.927, 0.928, 0.929, and 0.930 are included. Preferred are materials with a density of at least 0.931 g/cc, such as 0.935 g/cc.

The second polymer is preferably ethylene polymer having a density of less than 0.916 grams per cubic centimeter. The ethylene polymer having a density of less than 0.916 grams per cubic centimeter film is preferably an ethylene/alpha-olefin with a $C_4$ to $C_{10}$ comonomer, such as very low density polyethylene. Single-site catalyzed polymer, such as metallocene catalyzed polymer, can be used. Preferred densities for the second polymer are less than 0.915 g/cc, such as less than 0.914, 0.913, 0.912, and 0.911 g/cc. Densities of less than 0.910, such as less than 0.905, 0.904, 0.903, 0.902, 0.901, and 0.900 g/cc are included, such as less than 0.890, and 0.880 g/cc.

An optional third polymer which can be used with the first and second polymers comprises ethylene/unsaturated ester, preferably ethylene/vinyl ester copolymer such as ethylene/vinyl acetate copolymer, or ethylene/alkyl acrylate copolymer such as ethylene/butyl acrylate copolymer; or an ethylene polymer having a density of between 0.916 and 0.924 grams per cubic centimeter, such as linear low density polyethylene.

Figure 1:
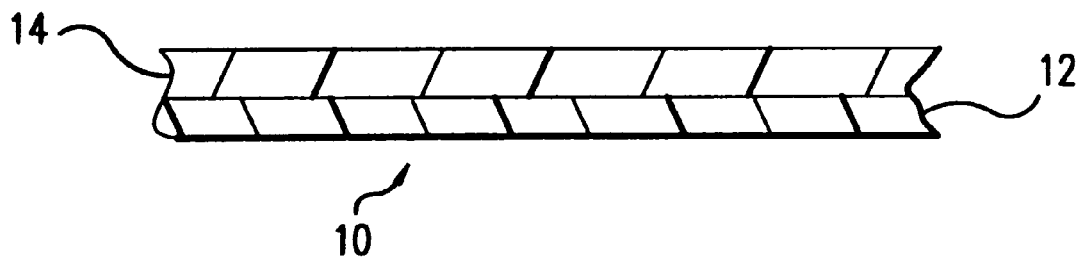
FIGS. 1 to 6 are schematic cross-sectional views of films of the present invention.

Referring to FIG. 1, which is a cross-sectional view of a preferred two layered embodiment of the present invention, it is seen that this embodiment comprises a core layer 14, and an outer layer 12. Core layer 14 comprises an oxygen barrier polymeric material, such as ethylene/vinyl alcohol copolymer, vinylidene chloride copolymer, polyester, and polyamide.

Outer layer 12 comprises any of the materials described above for the monolayer film.

Figure 2:
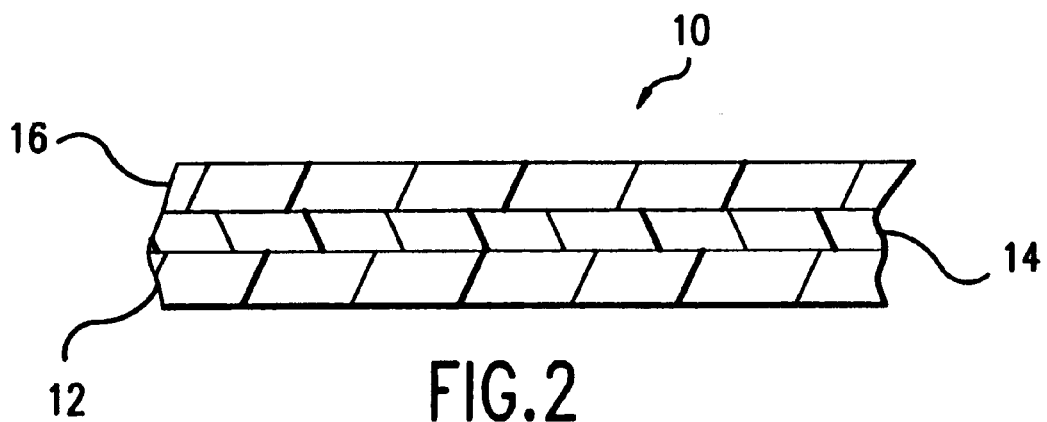

FIG. 2 describes a three layer embodiment of the present invention, layers 14 and 12 corresponding in composition to those of FIG. 1. Outer layer 16, disposed on the opposite side of core layer 14 from layer 12, can comprise any of the materials disclosed for layer 12.

Figure 3:
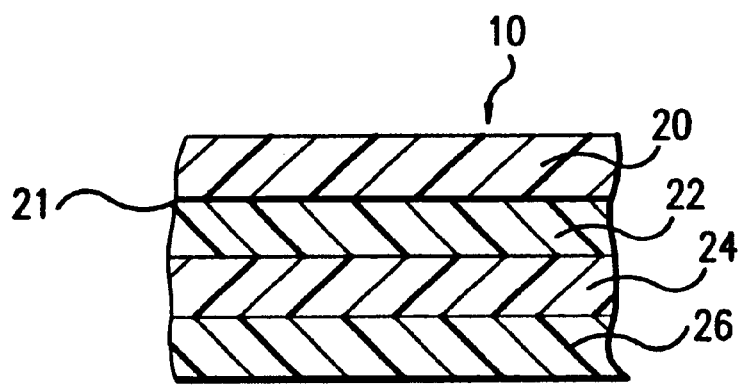

FIG. 3 illustrates a film comprising a core layer 24 corresponding in composition to core layer 14 of FIG. 2; two layers 22 and 26 corresponding in composition to layers 12 and 16 respectively, and a fourth layer 20. Layer 20 can represent an additional layer, e.g. an abuse resistant or heat sealable layer made from any suitable polymer, such as a polyolefin, polyamide, or polyester; or it can represent a discrete film laminated to layer 22.

Figure 4:
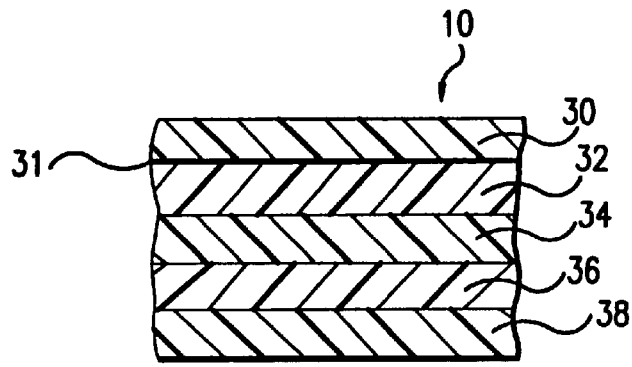

FIG. 4 shows a film comprising a core layer 34, corresponding to core layer 14 of FIG. 2. Two intermediate layers 32 and 36 preferably comprise a polyolefin, anhydride-modified polyolefin, or polyamide. These layers can include polymeric adhesives such as anhydride-grafted polymers, e.g anhydride-grafted LLDPE; ethylene/alpha olefins such as LLDPE, or even conventional adhesives such as polyurethane. Layers 32 and 36 can also include ethylene/unsaturated ester copolymer, such as ethylene/vinyl ester copolymer, e.g. ethylene/vinyl acetate copolymer, or ethylene/alkyl acrylate copolymer, e.g. ethylene/ethyl acrylate copolymer, ethylene/methyl acrylate copolymer, or ethylene/ butyl acrylate copolymer; or ethylene/ acid copolymer, such as ethylene/acrylic acid copolymer, or ethylene/ methacrylic acid copolymer. Two outer layers 30 and 38 correspond in composition to layers 12 and 16 respectively. Outer layers 30 and 38 are preferably surface layers.

Figure 5:
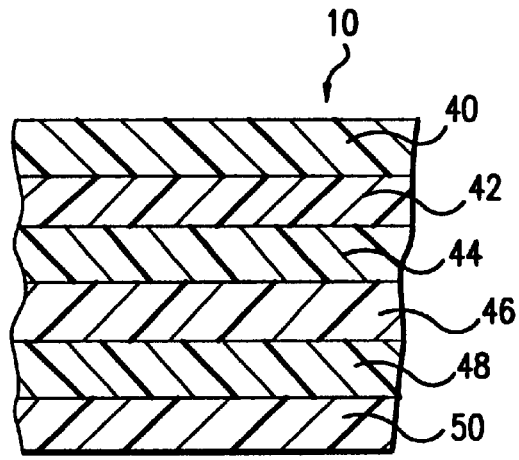

FIG. 5 shows a six layer embodiment in which layers 40, 42, 44, 46, and 48 correspond in composition to layers 30, 32, 34, 36, and 38 respectively. Layer 50 corresponds in composition to layer 20.

Figure 6:
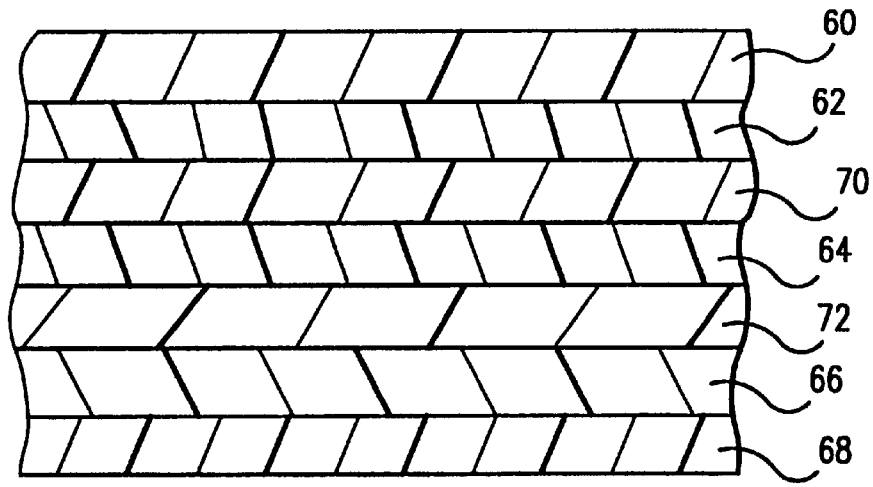

FIG. 6 shows a seven layer embodiment in which layers 60, 62, 64, 66, and 68 correspond in composition to layers 30, 32, 34, 36, and 38 respectively. Intermediate layers 70 and 72 comprise a polymer, more preferably a polyamide, including copolyamides and blends of polyamides.

Figure 7:
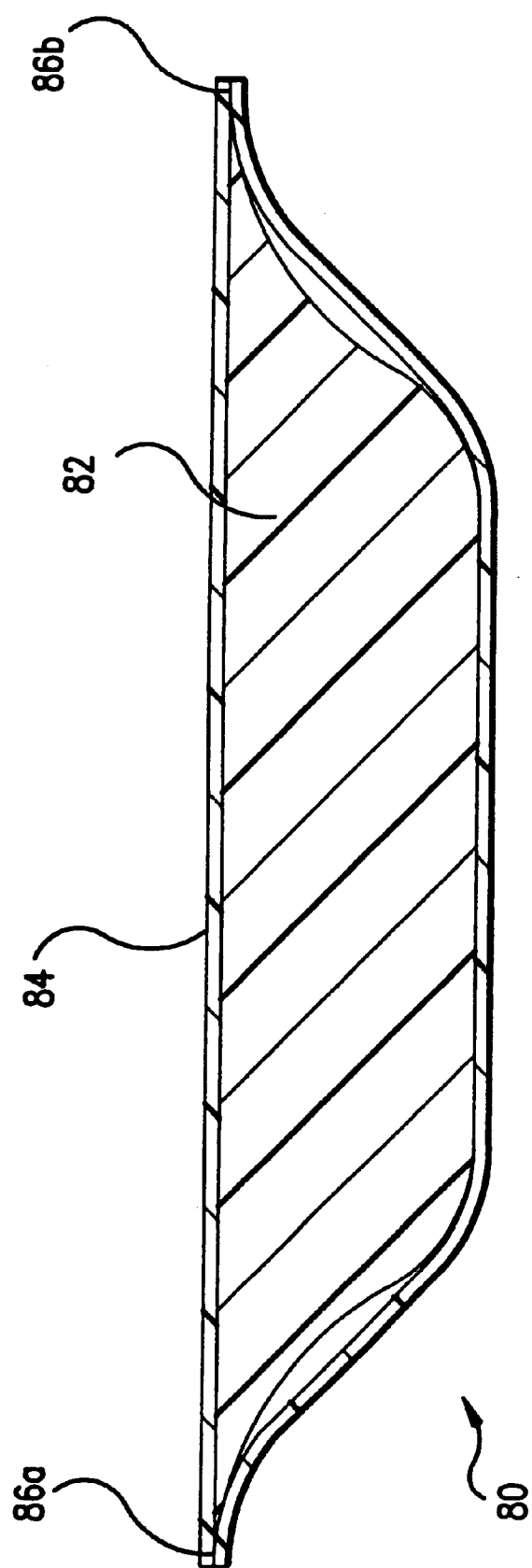
FIG. 7 is a schematic of an overwrapped tray.

FIG. 7 shows a package 80 wherein a foamed tray 82 contains a food product(not shown). The tray is overwrapped with film 84, and film is sealed at impulse seals 86a and 86b, and typically a bottom seal (not shown).

The invention can be further understood by reference to the examples given below. These films can be made by a conventional cast coextrusion, extrusion coating, extrusion lamination, conventional lamination, or other suitable process. If desired, these films can be partially or totally crosslinked by electronic or chemical means. If desired for a given end use, these films can be oriented by trapped bubble, tenterframe, or other suitable process. They can thereafter optionally be heat shrinkable, and optionally annealed. Final film thicknesses can vary, depending on process, end use application, etc. Typical thicknesses range from 0.1 to 20 mils, preferably 0.2 to 10 mils, such as 0.3 to 6 mils, 0.4 to 4 mils, and 0.5 to 3 mils such as 0.5 to 2 mils or 0.5 to 1.5 mils.

Crosslinking by Irradiation can be done by any conventional means. In the irradiation process, the film is subjected to an energetic radiation treatment, such as corona discharge, plasma, flame, ultraviolet, X-ray, gamma ray, beta ray, and high energy electron treatment, which induce cross-linking between molecules of the irradiated material. The irradiation of polymeric films is disclosed in U.S. Pat. No. 4,064,296, to Bornstein, et. al., which is hereby incorporated in its entirety, by reference thereto. Bornstein, et. al. disclose the use of ionizing radiation for crosslinking the polymer present in the film. Radiation dosages are referred to herein in terms of the radiation unit "RAD", with one million RADS, also known as a megarad, being designated as "MR", or, in terms of the radiation unit kiloGray (kGy), with 10 kiloGray representing 1 MR, as is known to those of skill in the art. A suitable radiation dosage of high energy electrons is in the range of up to about 10–200 kGy, more preferably about 20–180 kGy, and still more preferably, 30–160 kGy, such as 45 to 75 kGy. Preferably, irradiation is carried out by an electron accelerator and the dosage level is determined by standard dosimetry methods. Other accelerators such as a Vander Graff or resonating transformer may be used. The radiation is not limited to electrons from an accelerator since any ionizing radiation may be used. The ionizing radiation crosslinks the polymers in the film. The more preferred amount of radiation is dependent upon the film and its end use.

Table 1 identifies the materials used in the examples. The remaining tables describe the structure and properties of films made with these materials. Properties of the films are further explained in the footnotes to Table 1.

TABLE 1

| MATERIAL | TRADENAME | SOURCE |
|---|---|---|
| PE1 | Dowlex ™ 2045.04 | Dow |
| PE2 | Dowlex 2037 | Dow |
| PE3 | Affinity ™ PF 1140 | Dow |
| PE4 | Affinity PL 1270 | Dow |
| PE5 | Exact ™ 4011 | Exxon |
| PE6 | Attane ™ 4202 | Dow |
| PE7 | SLP-8-6031 | Exxon |
| PE8 | Exact 3027 | Exxon |
| PE9 | Affinity PL 1880 | Dow |
| PE10 | Affinity FW 1650 | Dow |
| PE11 | Affinity FM 1570 | Dow |
| PE12 | Affinity PL 1840 | Dow |
| PE13 | Affinity HF 1030 | Dow |
| EV1 | PE 1335 | Rexene |
| AD1 | Admer ™ SF 700 A | Mitsui |
| AD2 | Bynel ™ CXA 4104 | DuPont |
| PP1 | PD 9302 | Exxon |
| PP2 | Eltex ™P KS 409 | Solvay |
| PB1 | 0300 | Shell |
| PB2 | DP 1560 | Shell |
| OB1 | E-151 | Evalca |
| PA1 | Grilon ™CF6S | EMS |
| PA2 | Ultramid ™ C-35 | BASF |

PE1=LLDPE, an ethylene/1-octene copolymer with a density of 0.920 gm/cc and an octene-1 comonomer content of 6.5%.
PE2=LMDPE, an ethylene/1-octene copolymer with a density of 0.935 gm/cc. and an octene-1 comonomer content of 2.5%.
PE3=single site-catalyzed ethylene/1-octene copolymer with a density of 0.8965 gm/cc and octene-1 content of 14% by weight.
PE4=single site-catalyzed ethylene/1-octene copolymer with a density of 0.898 gm/cc and octene-1 content of 13% by weight.
PE5=single site-catalyzed ethylene/1-butene copolymer with a density of 0.885 gm/cc.
PE6=ethylene/1-octene copolymer with a density of 0.912 gm/cc and octene-1 content of 9% by weight.
PE7=single site-catalyzed ethylene/1-hexene copolymer with a density of 0.903 gm/cc.
PE8=single site-catalyzed ethylene/1-butene copolymer with a density of 0.900 gm/cc.
PE9=single site-catalyzed ethylene/1-octene copolymer with a density of 0.902 gm/cc and octene-1 content of 12% by weight.
PE10=single site-catalyzed ethylene/1-octene copolymer with a density of 0.902 gm/cc and octene-1 content of 12% by weight.
PE11=single site-catalyzed ethylene/1-octene copolymer with a density of 0.915 gm/cc and octene-1 content of 7.5%. by weight.
PE12=single site-catalyzed ethylene/1-octene copolymer with a density of 0.908 gm/cc and octene-1 content of 9.5% by weight.
PE13=single site-catalyzed ethylene/1-octene copolymer with a density of 0.935 gm/cc and octene-1 content of 2% by weight.
EV1=ethylene vinyl acetate copolymer with 3.3%. vinyl acetate monomer.
AD1=anhydride-grafted polyolefin blend.
AD2=anhydride-grafted polyolefin in ethylene-butene copolymer.
PP1=propylene/ethylene copolymer (3.3% ethylene).
PP2=propylene/ethylene copolymer (3.2% ethylene).
PB1=polybutylene.
PB2=polybutylene.
OB1=ethylene/vinyl alcohol copolymer (44 mole % ethylene).
PA1=nylon 6,12 copolymer.
PA2=nylon 6,66 copolymer.

In Table 2, six five-layer film structures in accordance with the invention, and one control film (C.1) are disclosed. These were each one mil (100 gauge) thick, and made by a coextrusion of the layers, and each had the structure:
A/B/C/B/A
The thickness ratio of the layers was:

| layer A | layer B | layer C | layer B | layer A |
|---|---|---|---|---|
| 2 | 2 | 1 | 2 | 2 |

All the films were biaxially oriented at 3.8×3.8 in the machine and transverse directions respectively. All films were irradiated by electron-beam irradiation.

The A layers of the films were a blend of 50% PE1, 25% PE2, and 25% of one of the materials indicated in Table 1, and identified for each example in Table 2. A small amount of anhydrous aluminum silicate (an antiblock) and mono- and diglyceride/propylene glycol (an antifog) were compounded into the resin blend such that, after compounding, the additives comprised about 6% of the total compounded blend.

The B layers were AD2; The C layer of the films were 90% OB1 +10% PA1.

TABLE 2

| Physical Property | C. 1 | Ex. 1 | Ex. 2 | Ex. 3 | Ex. 4 | Ex.5 | Ex.6 |
|---|---|---|---|---|---|---|---|
| third component in "A" layers | EV1 | PE8 | PE9 | PE10 | PE11 | PE6 | PE7 |
| Processability [a] | + | + | + | + | + | + | * |
| Hot tack window [b] (°C.) | 115–155 | 115–135 | 115–145 | 115–145 | 115–145 | 115–145 | 120–155 |
| Peak Force [c] (N) | 2.2 | 1.5 | 2.0 | 2.4 | 2.0 | 2.1 | 2.1 |
| static C.O.F.(out/SS) [d] | 0.41 | 0.44 | 0.43 | 0.39 | 0.35 | 0.36 | 0.77 |
| Film Melt Flow [e] (g/10 min.) | 2.8 | 3.2 | 4.0 | 2.9 | 4.8 | 3.6 | 1.5 |
| Clarity [f] | n/a | + | + | s | s | s | n/a |
| Haze [g] | n/a | s | s | w | w | w | n/a |
| Sealing Window [h] | 115–185 | 100–185 | 105–195 | 105–195 | 105–170 | 110–195 | ** |
| Leakers [i] (%) 50 ppm | 0 | 3 | 0 | 1 | 5 | 0 | n/a |
| Leakers (%) 70 ppm | n/a | n/a | n/a | n/a | n/a | n/a | n/a |
| Machinability [j] 50 ppm | ++ | + | + | p | ++ | + | ** | ppm=parts (packages) per minute.
n/a=not available or applicable.

In Table 3, four additional five-layer film structures of the invention, and one control film (C.2) are disclosed. C.2 was compositionally and structurally like C.1. Examples 7 to 10 were coextruded, and each had the same A/B/C/B/A structure, thickness, thickness ratio of each layer, degree of irradiation and orientation as in Examples 1 to 6.

The A layers of the films were a blend of 50% PE2, and 50% of the material identified for each example in Table 3. Slip and antiblock additives comprised about 6% of the total compounded blend.

The B layers of the films were AD2.

The C layer of the films was 90% OB1+10% PA1.

TABLE 3

| Physical Property | C. 2 | Ex. 7 | Ex. 8 | Ex. 9 | Ex. 10 |
|---|---|---|---|---|---|
| second component in "A" layers | n/a | PE8 | PE11 | PE6 | PE9 |
| Processability [a] | + | + | + | + | * |
| Hot tack window [b] (°C.) | 115–145 | none | 115–145 | 115–145 | 115–135 |
| Peak Force [c] (N) | 1.5 | 0.7 | 2.1 | 1.6 | 1.4 |
| static C.O.F.(out/SS) [d] | 0.32 | 0.66 | 0.43 | 0.74 | *** |
| Film Melt Flow [e] (g/10 min.) | 1.7 | 4.1 | 3.9 | 2.1 | 4.2 |
| Clarity [f] | n/a | w | w | w | + |
| Haze [g] | n/a | + | + | + | ++ |
| Sealing Window [h] | 80–165 | 90–155 | 90–175 | 80–155 | 80–90 |
| Leakers [i] (%) 50 ppm | 0 | 1 | 0.5 | 0.5 | — |
| Leakers (%) 70 ppm | 17 | 79 | 31 | 3 | — |
| Machinability [j] 50 ppm | ++ | p | + | p | ** |

*** = blocked.

In Table 4, five additional five-layer film structures of the invention, and one control film (C.3) are disclosed. C.3 was compositionally and structurally like C.1. Examples 11 to 15 were coextruded, and each had the same A/B/C/B/A structure, thickness, thickness ratio of each layer, degree of irradiation and orientation as in Examples 1 to 6, except that the film of Ex. 12 was irradiated to a greater degree than the film of Ex. 11.

The A layers of the films of Examples 11, 12, and 15 were a blend of 50% PE2, and 50% of the material identified for these examples in Table 4.

The A layers of the film of Example 13 was a blend of 30% PE2, and 70% of PE11.

The A layers of the film of Example 14 was a blend of 30% PE2, 40% PE11, and 30% PE12.

Slip and antiblock additives comprised about 6% of the total compounded blend.

The B layers of the films were AD2.

The C layer of the films was 90% OB1+10% PA1.

TABLE 4

| Physical Property | C. 3 | Ex.11 | Ex. 12 | Ex. 13 | Ex.14 | Ex.15 |
|---|---|---|---|---|---|---|
| second component in "A" layers | n/a | PE11 | PE11 | — | — | PE12 |
| Processability [a] | + | + | + | + | + | + |
| Hot tack window [b] (°C.) | 115–145 | 115–145 | n/a | 110–145 | 115–145 | 115–145 |
| Peak Force [c] (N) | 1.5 | 2.0 | n/a | 2.2 | 1.7 | 2.0 |
| static C.O.F.(out/SS) [d] | 0.37 | 0.36 | n/a | 0.39 | 0.43 | 0.43 |
| Film Melt Flow [e] (g/10 min.) | 2.4 | 2.7 | n/a | 3.3 | 2.3 | 2.2 |
| Clarity [f] | n/a | + | n/a | + | + | + |
| Haze [g] | n/a | s | n/a | s | + | w |
| Sealing Window [h] | 110–180 | 105–155 | 105–155 | 105–200 | 105–155 | 105–200 |
| Leakers [i] (%) 50 ppm | 5 | 4 | 3 | 18 | 2 | 8 |
| Leakers (%) 70 ppm | n/a | 10 | 78 | 26 | 43 | 15 |
| Machinability [j] 50 ppm | ++ | ++ | ++ | ++ | p | + |

In Table 5, seven additional five-layer film structures of the invention, and one control film (C.4) are disclosed. C.4 was compositionally and structurally like C.1. Examples 16 to 21 were coextruded, and each had the same A/B/C/B/A structure, thickness, thickness ratio of each layer, degree of irradiation and orientation as in Examples 1 to 6, except that the film of Ex. 18 was irradiated to a lesser extent than the film of Ex. 18a.

The A layers of the film of Example 16 were a blend of 50% PE13, and 50% of PE6.

The A layers of the films of Examples 17 to 21 were a blend of 40% PE2, 30% PE11, and 30% of the material identified for these example in Table 4.

Slip and antiblock additives comprised about 6% (Example 16) or 4.5% (Examples 17 to 21) of the total compounded blend.

The B layers of the films were AD2.

The C layer of the films was 90% OB1+10% PA1.

Two additional films of the invention, Examples 22 and 23, not described in the Tables, had the same structure as Examples 17 to 21, but with the third component in the "A" layers comprising PB1 (Ex.22) and PB2 (Ex.23).

TABLE 5

| Physical Property | C. 4 | Ex. 16 | Ex. 17 | Ex. 18 | Ex. 18a | Ex. 19 | Ex. 20 | Ex. 21 |
|---|---|---|---|---|---|---|---|---|
| third component in "A" layers | n/a | n/a | PE3 | PE5 | PE5 | PE4 | PP1 | PP2 |
| Processability [a] | + | RP | HB | HB | HB | HB | HB | HB |
| Hot tack window [b] | 115–140 | 115–145 | 110–140 | 115–120 | 115–120 | 110–145 | 110–185 | 110–185 |

TABLE 5-continued

| Physical Property | C. 4 | Ex. 16 | Ex. 17 | Ex. 18 | Ex. 18a | Ex. 19 | Ex. 20 | Ex. 21 |
|---|---|---|---|---|---|---|---|---|
| (° C.) | | | | | | | | |
| Peak Force[c] (N) | 1.4 | 1.9 | 1.7 | 1.0 | 1.0 | 1.8 | 1.7 | 2.4 |
| static C.O.F. (out/SS)[d] | 0.35 | 0.38 | 0.30 | 0.32 | 0.32 | 0.28 | 0.36 | 0.34 |
| Film Melt Flow[e] (g/10 min.) | 3.3 | 3.7 | 2.6 | n/a | 1.8 | 3.2 | 3.8 | 3.2 |
| Clarity[f] | n/a | + | w | w | w | w | w | w |
| Haze[g] | n/a | w | w | w | w | w | w | w |
| Sealing Window[h] | 105–165 | 105–175 | 105–195 | 105–175 | 105–200 | 100–200 | none | none |
| Leakers[i] (%) 50 ppm | 3 | 5 | 0 | 2 | 1 | 1 | n/a | n/a |
| Leakers (%) 70 ppm | 4 | 11 | 31 | 33 | 100 | 42 | n/a | n/a |
| Machinability[j] 50 ppm | ++ | ++ | ++ | ++ | ++ | ++ | ++ | ++ |

RP = reduced pressure.
HB = hazy bubble.

In Table 6, five additional five-layer film structures of the invention, and one control film (C.5) are disclosed. C.4 was compositionally and structurally like C.1. Examples 24 to 26a were coextruded, and each had the same A/B/C/B/A structure, thickness, thickness ratio of each layer, and orientation as in Examples 1 to 6. Ex. 25 and 26a were irradiated at the same absorbed dosage; Ex. 25a at a greater dosage than Ex. 25; and the film of Ex. 26a lesser dosage than Ex. 25.

The A layers of the film of Example 24 were a blend of 50% PE1, 25% PE2, and 25% PE6. The A layers of the film of Examples 25 and 25a were 50% PE2, and 50% PE6. The A layers of the film of Examples 26 and 26a were 40% PE2, and 60% PE6. Antifog and antiblock additives were present in small amounts in these examples.

The B layers of the films were AD2.

The C layer of the films was 90% OB1+10% PA1.

TABLE 6

| Physical Property | C. 5 | Ex.24 | Ex.25 | Ex. 25a | Ex.26 | Ex.26a |
|---|---|---|---|---|---|---|
| Processability [a] | + | + | + | + | + | + |
| Hot tack window [b] (°C.) | 115–140 | 115–140 | 115–140 | 115–135 | 115–150 | 115–140 |
| Peak Force [c] (N) | 1.9 | 2.5 | 2.2 | 2.0 | 2.3 | 2.4 |
| Clarity (%) | 75 | 82 | 75 | 76 | 80 | 80 |
| Haze (%) | 6.7 | 5.7 | 6.9 | 6.6 | 5.8 | 5.8 |
| Sealing window [h] | 110–210 | 110–210 | 110–210 | 110–210 | 110–180 | 110–210 |
| Leakers [i] (%) 50 ppm | 1 | 0 | 0 | 1 | 0 | 1 |
| Leakers (%) 70 ppm | 2 | 2 | 2 | 2 | 2 | 20 |
| Film Melt Flow [e] | 2.7 | 4.5 | 4.1 | n/a | n/a | n/a |

RP = reduced pressure.
HB = hazy bubble.

Two additional films of the invention, Exs. 27 and 28, and two corresponding control films (C.6 and C.7) were made, each having the structure:

A/B/C/D/C/B/A

C.6 had the structure:

| 25% PE1 +50% PE2 +25% EV1 | / PE2 / AD1 / | 90% OB1 + 10% PA1 | / AD1 / PE2 / | 25% PE1 +50% PE2 +25% EV1 |

Example 27 had the structure:

| 50% PE2 + 50% PE6 | / PE2 / AD1 / | 90 OB1 + 10 PA1 | / AD1 /PE2/ | 50PE2 + 50PE2 |

C.6 and Ex. 27 had layer thickness ratios:

3/1/1/1/1/1/3

These films were oriented at 3.8×3.8 in the machine and transverse directions respectively. Both films were irradiated. A small amount of antiblock and antifog additives were included in the outside layers of each film.

Performance data comparing Example 27 and Control 6 is found in Table 7.

| 75PE1 + 25PE2 | /AD2/ | 80PA2 + 20PA1 | 90 OB1 + 10 PA1 | 80PA2 + 20PA1 | / AD2 / | 75PE1 + 25PE2 |

C.7 had the structure:

TABLE 7

| Physical Property | C. 6 | Ex.27 |
|---|---|---|
| Hot tack window [b] (°C.) | 115–130 | 120–130 |
| Peak Force (N) | 1.7 | 1.6 |
| Film Melt Flow [e] (g/10 min.) | 6.3 | 6.1 |
| Sealing Window [h] | 90–170 | 100–140 |

TABLE 7-continued

| Physical Property | C. 6 | Ex.27 |
|---|---|---|
| Leakers (%) 70 ppm | 78 | 15 |

C.7 had layer thickness ratios:

3/1/1/1/1/1/3

Example 28 had the structure:

| 50PE2 + 50PE6 | /AD2/ | 80PA2 + 20PA1 | 90 OB1 / + 10 PA1 | 80PA2 / + 20PA1 | /AD2/ | 50PE2 + 50PE6 |

Ex. 28 had layer thickness ratios:

2/2/1/1/1/2/2

Control 7 and Ex. 28 were oriented at 3.4×3.4 in the machine and transverse directions respectively. Both films were irradiated. A small amount of antiblock and antifog additives were included in the outside layers of each film. Performance data comparing Example 28 and Control 7 is found in Table 8.

TABLE 8

| Physical Property | C. 7 | Ex.28 |
|---|---|---|
| Hot tack window [b] (°C.) | 115–170 | 115–170 |
| Peak Force [c] (N) | 4.3 | 5.8 |
| Sealing Window [h] | 160–170 | 130–230 |
| Leakers (%) 50 ppm | 7 | 0 |
| Abuse Failure (%) | 11 | 4 |

The abuse failure data of Table 8 is further described in Table 9.

TABLE 9

| Example | Corner Cut | Edge Cut | Bottom Abrasion | Total Abuse Failures* |
|---|---|---|---|---|
| C.7 | 0 | 6 | 2 | 8 (11%) |
| 28 | 1 | 2 | 0 | 3 (4%) |

*N = 72. Test was run using Thermaplate SF 66050 CPET Tray.

The film of the present invention can have any suitable number of layers; can be a monolayer film, or have 2,3,4, 5,6,7,8,9, or more layers. Films can be symmetric or asymmetric in construction.

Films of the invention can utilize different materials for the outer 10 layers or for the intermediate layers, so that e.g. two "A", "B", or "C" layers can be different from each other in composition, degree of crosslinking, thickness, or other parameters.

It can be seen that improvements in several film parameters are beneficially obtained by the present invention. For films with equal levels of irradiation, films of the invention exhibited improved flowability, as measured by film melt flow index (MFI). For example, in Table 2, C.1 has an MFI of 2.8, compared with an MFI of between 2.9 and 4.8 for Exs. 1 to 5; in Table 3, C.2 has an MFI of 1.7, compared with an MFI of between 2.1 and 4.2 for Exs. 7 to 10. In Table 6, C.5 has an MFI of 2.7, compared with an MFI of 4.1 (Ex.25) and 4.5 (Ex.24). Table 8 also shows a peak force of 1.9 for C.5, compared with a peak force of between 2.0 and 2.5 for Examples 24 to 26a. These melt flow index and peak force values result in better package performance by reducing the % leakers in packages made at relatively high speeds (70 ppm). For example, C.1 of Table 3 resulted in 17% leakers at 70 ppm, whereas Ex. 9 had only 3% leakers at the same packaging speed. In Table 7, C.6 resulted in 78% leakers at 70 ppm, whereas Ex. 27 had only 15% leakers at the same packaging speed.

Films of the invention also showed improved optics, with Table 6 showing control film 5 with a clarity of 75%, and a haze of 6.7%. Examples 24 to 26a showed either equivalent optical clarity (Example 25) or improved clarity (76 to 82% in Examples 24 and 25a to 26a). Except for Example 25, Examples 24 to 26a showed lower (i.e. improved) haze values.

Compared with C.7, example 28 showed lower leakers (0% versus 7%), improved abuse resistance (4% cuts versus 11% cuts), and higher hot tack peak force (5.8 versus 4.3 N)

What is claimed is:

1. A multilayer film comprising:
    a) a core layer comprising an ethylene/vinyl alcohol copolymer;
    b) two outer layers each comprising a blend of
        i) a first polymer selected from the group consisting of linear medium density polyethylene, high density polyethylene, polypropylene, and propylene/ethylene copolymer, and
        ii) a second olefinic polymer comprising a heterogeneous ethylene/alpha-olefin copolymer with a density of less than 0.915 grams per cubic centimeter; and
    c) two intermediate layers each disposed between the core layer and a respective outer layer, each intermediate layer comprising a blend of nylon 6,66 and nylon 6,12.
2. The film of claim 1 wherein the film is crosslinked.
3. The film of claim 1 wherein the film has a thickness of between 0.4 and 2.0 mils.
4. The film of claim 1 wherein the film has a hot tack strength of at least two Newtons.
5. The film of claim 1 wherein the second polymer comprises very low density polyethylene.
6. The film of claim 1 further comprising, in each of the two outer layers, a third polymer selected from the group consisting of ethylene polymer having a density of between 0.916 and 0.924 grams per cubic centimeter, and ethylene/unsaturated ester copolymer.
7. The film of claim 6 wherein the third polymer comprises linear low density polyethylene.
8. The film of claim 6 wherein the ethylene/unsaturated ester copolymer is selected from the group consisting of ethylene/vinyl acetate copolymer and ethylene/alkyl acrylate copolymer.
9. The film of claim 1 wherein the film is oriented.
10. The film of claim 1 wherein the film is heat shrinkable.

* * * * *